United States Patent [19]

Gottschalk et al.

[11] Patent Number: 5,932,663
[45] Date of Patent: Aug. 3, 1999

[54] BLOCK COPOLYMER AND PREPARATION THEREOF BY ANIONIC POLYMERIZATION

[75] Inventors: Axel Gottschalk, Neustadt; Raimund Stadler, Mommenheim; Karsten Jung, Mainz; Susanne Brinkmann, Ober Olm; Vittoria Balsamo-Hernandez, Mainz, all of Germany

[73] Assignee: BASF Aktiengesellschaft, Ludwigshafen, Germany

[21] Appl. No.: 08/860,028

[22] PCT Filed: Nov. 14, 1996

[86] PCT No.: PCT/EP96/04990

§ 371 Date: Jul. 3, 1997

§ 102(e) Date: Jul. 3, 1997

[87] PCT Pub. No.: WO97/18250

PCT Pub. Date: May 22, 1997

[30] Foreign Application Priority Data

Nov. 15, 1995 [DE] Germany ............................ 195 42 643

[51] Int. Cl.$^6$ ..................................................... C08G 63/08
[52] U.S. Cl. .............................. 525/314; 525/91; 525/242; 525/333.3; 525/386
[58] Field of Search ............................... 525/91, 242, 314, 525/333.3, 386

[56] References Cited

U.S. PATENT DOCUMENTS

| | | | |
|---|---|---|---|
| 3,890,408 | 6/1975 | Schepers | 525/310 |
| 4,360,643 | 11/1982 | Naylor | 525/386 |
| 5,100,943 | 3/1992 | Katoh | 524/227 |

FOREIGN PATENT DOCUMENTS

| | | |
|---|---|---|
| 026629 | 11/1968 | Japan . |
| 190911 | 8/1991 | Japan . |

*Primary Examiner*—David Buttner
*Attorney, Agent, or Firm*—Keil & Weinkauf

[57] ABSTRACT

A process for preparing block copolymers containing at least one block A, constructed from units of styrene or its technical equivalents (a), and at least one block C, constructed from units of a cyclic lactone (c), by anionic polymerization comprises reacting the living chain end remaining following the construction of block A with a diarylethylene, especially 1,1-diphenylethylene, under anionic polymerization conditions before reaction with the monomer (c), and preferably attaching in a conventional manner to the living end of block A a further block B, constructed from units of a diene, and also at least one further monomer unit (a) before the reaction with the diarylethylene. The block copolymer is useful for producing shaped articles, films or fibers or as a compatibilizer in polymer blends.

9 Claims, No Drawings

BLOCK COPOLYMER AND PREPARATION THEREOF BY ANIONIC POLYMERIZATION

DESCRIPTION

The present invention relates to a novel block copolymer composed of at least one block A, constructed from units of styrene or its technical equivalents (a), and at least one block C, constructed from units of a cyclic lactone (c), the block copolymer being obtainable by anionic polymerization, and to a process for its preparation. More particularly, the invention relates to block polymers based on ε-caprolactone as cyclic lactone (c).

The invention further relates to the use of the block copolymers of the invention for producing shaped articles, films or fibers and to the shaped articles, films or fibers obtained from the block copolymers of the invention. The invention further relates to the use of the block copolymers as compatibilizers.

Block copolymers containing units derived from styrene and diene monomers are customarily prepared by anionic polymerization. It is also known to react (cap) the living chain ends of polybutadiene remaining from the anionic polymerization with certain coupling reagents before further reaction with polymers such as poplystyrene. This has the advantage that the desired block copolymers are obtained more rapidly and that multifunctional coupling reagents can be used to construct branched block copolymers (see for example Morton, Anionic Polymerisation-Principles and Practice, Academic Press, New York, London, 1983, pages 226–230).

Hsieh, Journal of Applied Polymer Science, 22 (1978), 1119, describes block copolymers of styrene, butadiene and lactones. Initially, living polystyrene-block-polybutadiene (Li) is prepared. Before reaction with the lactone, the living chain ends are converted into an alkoxy group to prepare the chain end for the attachment of the lactone.

C. Auschra (thesis, Mainz 1992) disclosed block copolymers composed of styrene, butadiene and methyl methacrylate blocks. Following the preparation of polystyrene-b-polybutadiene (Li), the living chain ends of the butadiene block are capped with diphenylethylene and then reacted with methyl methacrylate. The diphenylethylene has the effect of reducing the reactivity of the living chain end and so of reducing secondary reactions. It is true that the block copolymers obtainable by this method have high molecular weights and a narrow molecular weight distribution, but the reaction of the chain ends with the diphenylethylene is problematic, since it is frequently too slow and not quantitative. Yet a substantially quantitative reaction is necessary, if secondary reactions are to be suppressed and high yields are to be obtained. This is especially necessary for processes which are to be practiced on an industrial scale.

It is an object of the present invention to provide a polymerization process of the type mentioned at the beginning whereby such block copolymers can be prepared rapidly, in high yields and purities and also with a narrow molecular weight distribution.

We have found that this object is achieved by reacting the living chain end remaining following the construction of block A with a diarylethylene of the general formula I

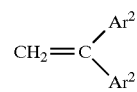

where $Ar^1$ and $Ar^2$ are independently of each other aryl with or without $C_1$–$C_8$-alkyl or $C_1$–$C_8$-alkoxy or halogen single or multiple substitution, under anionic polymerization conditions before reaction with the monomer (c).

In an advantageous embodiment of the invention, the reaction with the diarylethylene I or the block C is preceded by initially, in a conventional manner, attaching to the living end of block A a further block B, constructed from units (b) of a diene, to obtain copolymers of the type of the known rubber-elastic styrene-butadiene-block copolymers, which are then modified by means of block C. To be able to bind the diarylethylene I to the block B, however, it has been found to be desirable first to attach at least one further monomer unit (a) to block B. From experience it is sufficient for from 1 to 5 equivalents of monomer unit (a) to be attached.

The diarylethylene I used is conveniently the simplest compound of this class of compounds, namely 1,1-diphenylethylene, and monomer (b) is advantageously 1,3-butadiene or isoprene.

The block copolymers obtainable by the process of the invention contain at least one block A constructed exclusively or essentially of units of styrene or its technical equivalents.

To prepare block structures of type B, conjugated dienes are used as monomer (b), if a block B is envisioned. Suitable conjugated dienes include not only 1,3-butadiene and isoprene but also, for special purposes, other, not only linear but also cyclic, dienes, for example those having from 4 to 8 carbon atoms. Specific examples are 1,3-butadiene, 1,3-pentadiene, 2-methyl-1,3-butadiene, 2,3-dimethyl-1,3-butadiene and conjugated hexadienes, preferably 1,3-hexadiene. It is also possible to use optional mixtures of different monomers (b) for constructing block B.

The average molecular weight of block A, like that of block B and that of block C, is uncritical within wide limits. In general, the average molecular weights are chosen according to the properties which are desired for the block copolymer. Typically, the average molecular weight (number average value $M_n$) of each block A, of block B, if present, and of each block C is within the range from 5000 to 500,000, preferably from 10,000 to 100,000, [g/mol].

The block copolymers obtainable by the process of the invention can also contain at least one further block D of a similar molecular weight, constructed from anionically polymerizable monomers (d) which contain a functional group.

Particularly preferred monomers (d) which are suitable are the $C_1$–$C_{18}$-alkyl esters of methacrylic acid or of acrylic acid or mixtures thereof. Usable examples thereof are methyl acrylate, ethyl acrylate, n-propyl acrylate, i-propyl acrylate, n-butyl acrylate, i-butyl acrylate, s-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate and stearyl acrylate, preferably methyl acrylate, n-butyl acrylate and 2-ethylhexyl acrylate, and also mixtures thereof. If such a block is to be polymerized onto a block of type A, it is advantageous to react the living chain end in question first with a diphenylethylene of the formula I in a conventional manner. Preferred esters of methacrylic acid are methyl methacrylate and also mixtures of these monomers (d).

It is similarly possible to form block copolymers with blocks of other monomers D which have functional groups, such as —OH, —SH, —NHalkyl and so on. In general, it is necessary to protect such functional groups, for example by means of trialkylsilyl groups, ahead of the anionic polymerization, since they would interfere with it. Such polymerization processes in the presence of protective groups are described for example in S. Nakahama et al., Prog. Polym. Sci. Vol. 15 (1990), 299–335.

Examples of further such monomers include p-aminostyrene, p-hydroxystyrene, p-vinylbenzoic acid, acrylic acid, methacrylic acid, acrylamide, methacrylamide, maleic acid and also its imides or $C_1$–$C_{10}$-alkyl esters, fumaric acid and its imides or $C_1$–$C_{10}$-alkyl esters, itaconic acid and its imides or $C_1$–$C_{10}$-alkyl esters, acrylonitrile, methacrylonitrile or hydroxyalkyl (meth)acrylates.

The molecular weight (number average value $M_n$) of block D can vary within wide limits, but is generally within the range from 5000 to 500,000, preferably within the range from 10,000 to 100,000, [g/mol].

Specific examples of styrene monomers (a) are styrene, p-chloro-styrene, α-methylstyrene, p-methylstyrene, vinyltoluene and p-t-butylstyrene. Block A can also be constructed from a mixture of different monomers. Preferably, however, styrene is used alone.

The block copolymers obtainable by the process of the invention are usually block copolymers of the type AC or triblock copolymers of the type ABC. However, they can also be, for example, triblock copolymers of the type BABC. It is similarly possible for them to be higher block copolymers, for example up to 10-block copolymers. However, usually they do not contain more than five or six blocks, since such block copolymers, although readily preparable, are generally too complicated for technical applications. The block copolymers obtainable by the process of the invention contain the or each block C as outer blocks, since they are always polymerized last. Particularly preferred block copolymers are polybutadiene-b-poly(ε-caprolactone), polystyrene-b-polybutadiene-b-poly(ε-caprolactone). Particularly preferred block copolymers include those in which polybutadiene is incorporated rated and has a high proportion of 1,4-linked units.

The average molecular weights (number average value $M_n$) of the block copolymers obtainable by the process of the invention are usually altogether not significantly higher than 1,000,000 [g/mol] and usually not significantly lower than 10,000 [g/mol]. In general, they are within the range from 50,000 to 500,000 [g/mol]. Preferred block copolymers have molecular weights (number average value $M_n$) within the range from 75,000 to 250,000 [g/mol].

According to the invention, the block copolymers are prepared by anionic polymerization.

Suitable initiators for the anionic polymerization reaction are compounds which convert the monomers into their anions. Alkali organometallic compounds, preferably lithium alkyl compounds such as methyllithium, ethyllithium, n- or s-butyllithium or s-propyl-lithium, are among suitable initiators. Particular preference is given to using n- or s-butyllithium. It will be appreciated that, if multifunctional compounds, for example bifunctional ones, are used in a known manner instead of monofunctional initiators, block copolymers are obtained which have a mirror image construction, in which each half has the construction according to the invention.

Suitable solvents for the anionic polymerization are those which are chemically inert toward the polymer anions formed. Such solvents include straight-chain or branched aliphatic hydrocarbons, such as n-hexane or n-octane, and also simple or substituted cycloaliphatic hydrocarbons, for example cyclohexane or methyl-cyclohexane. It is similarly possible to use aromatic hydrocarbons, for example benzene, toluene or ethylbenzene, as solvents. It is also possible to use mixtures of different solvents. Preferred solvents include cyclohexane and ethylbenzene.

It is further possible for ethers such as tetrahydrofuran or diethyl ether and also tertiary amines, for example tetramethylethylenediamine or pyridine, to be present as cosolvents. In general, their proportion of the total solvent quantity is not more than 0.01–20, preferably 0.01–2, % by weight. Tetrahydrofuran is generally the preferred cosolvent.

However, it can also be advantageous to conduct the anionic polymerization in different solvents or solvent mixtures, depending on the nature of the monomer or monomer mixture to be polymerized. For instance, the polymerization of the apolar block A or optionally B can be carried out in an apolar solvent or solvent mixture, whereas the polymerization of the polar block C can be carried out in a polar solvent. This can take the form of adding a polar solvent to the reaction mixture on completion of the polymerization of an apolar block. However, it is also possible to add the apolar reaction mixture to a polar solvent. Similarly, the apolar solvent can first be wholly or partly removed from the reaction mixture, for example by distillation or use of reduced pressure. Possible apolar solvents are the aforementioned solvents; preferred polar solvents are aliphatic or cycloaliphatic ethers, especially tetrahydrofuran.

If, for example, 1,3-butadiene is reacted to form block B in an apolar solvent, the proportion of butadienes linked to one another via the carbon atoms 1 and 4 is very high (usually above 80%), which can result in a block A having a low glass transition temperature (within the range from about −80 to −100° C.).

As usual, it is necessary to free all starting materials meticulously from oxygen and active-proton impurities, which can be accomplished by prior reaction with a small amount of an organo-metallic compound or by adsorptive purification, for example with calcium hydride. The polymerization is carried out as usual under inert gas at temperatures from −100 to +120° C., preferably at from −80 to +80° C. In general, pressures are employed at which the monomers and solvents do not evaporate at the polymerization temperature.

According to the invention, the anionic polymerization is carried out in two or more stages, in each of which the monomers of the individual blocks are polymerized to completion. The order in which the blocks are prepared is not essential to the invention.

What is essential to the invention is that the living end of block A or B (the latter after reaction with a small amount of monomer (a)) is initially reacted (capped) with a diphenylethylene of the general formula I, before the reaction with the monomers (c) takes place. If block copolymers of the type BAB are prepared—by using bifunctional initiators, for example—it will be appreciated that both the living ends have to be capped.

For each living end consisting of a radical of a block B the amount of the or each styrene monomer (a) used should generally be within the range from 1 to 20, preferably from 1 to 10, equivalents. The or each living end of block B is particularly preferably capped with from 1 to 5 equivalents of styrene monomer (a).

The subsequent reaction with a diphenylethylene compound of the general formula I is generally carried out using from 1 to 10, preferably from 1 to 5, especially from 1 to 3, equivalents of diphenylethylene per equivalent of living chain end.

After the construction of the block copolymer is completed, the anionic polymerization is generally terminated by admixing the reaction mixture with water or alcohols such as methanol or isopropanol to deactivate the surviving end groups or excess initiator.

The block copolymers obtained, if they contain polybutadiene blocks, can be hydrogenated to convert them into polymers in which the aliphatic unsaturated bonds are wholly or partly saturated, i.e. which have a degree of hydrogenation of from 50 to 100% by weight, preferably from 70 to 100% by weight, especially from 90 to 100% by weight.

The hydrogenation is preferably carried out using molecular hydrogen and catalysts based on metals or metal salts of group eight of the periodic table of the elements. It can take place in heterogeneous phase, for example with Raney nickel, or preferably in homogeneous phase with catalysts based on salts, especially carboxylates, alkoxides or enolates, of cobalt, of nickel or of iron, combined with metal alkyls, especially with aluminum alkyls, or homogeneously by means of diimines produced in situ from tosyl hydrazide, for example. Processes for selective hydrogenation of block copolymers are described in U.S. Pat. Nos. 3,113,986 and 4,226,952, among others.

To isolate the polymer, the polymerization mixture can as usual either be directly heated to dryness or be treated with steam, in which case the solvent is distilled off. It can also be precipitated in an excess of a nonsolvent such as ethanol and separated off mechanically and dried, or worked up by extruder devolatilization.

The block copolymers obtainable by the process of the invention can be processed into shaped articles, films or fibers. This can be done for example by customary processes such as extrusion or injection molding. The block copolymers are also useful as compatibilizers in polymers blends, for example for blends of styrene polymers with polycarbonates, styrene/acrylonitrile copolymers, polyphenylene ethers and polycarbonates, polyphenylene ethers and/or polyarylene ethers such as polyarylene ether sulfones or ketones with polycarbonates.

EXAMPLES

Preparation of block copolymers

All the monomers and the solvent were as substantially as possible freed from oxygen and active-proton substances before use. All operations were carried out in a 6 1 stirred glass autoclave in the absence of air and moisture. The solvent quantity was 3500 ml in each case, the total amount of monomer 600 g, split between the various monomers according to the desired composition.

The solvent used for the anionic polymerization was benzene admixed, prior to the start of the polymerization, with a small amount of styrene and sufficient butyllithium to form the light yellow color of the anion. For the polymerization, the calculated amount of s-butyllithium was initially charged as initiator and the necessary amount of styrene (s) added at 40° C. After a polymerization time of 4 hours, a sample was taken from the solution and precipitated in methanol to determine the molecular weight of the polystyrene block. The required amount of butadiene (b) was condensed into the reaction mixture at −10° C. and polymerized at 40° C. After a polymerization time of 12 hours, a sample was taken and precipitated to determine the molecular weight of the styrene-butadiene block copolymer.

Prior to capping with diphenylethylene (DPE) 2 ml of styrene were added. After 4 hours 2 ml of DPE were injected. After 30 min the temperature was lowered to −25° C., and the calculated amount of ε-caprolactone (c) was added and vigorously stirred in. The reaction was discontinued after a further few minutes using a 5/1 mixture of benzene and acetic acid and the styrene-butadiene-caprolactone triblock copolymer was precipitated in methanol.

Thereafter the molecular weights and compositions of the triblock copolymers were determined by means of GPC and $^1$H-NMR spectroscopy. The molecular characteristics of various triblock copolymers are reported in Table 1. The phase behavior of the block copolymers was investigated by differential scanning calorimetry (DSC). The data obtained are summarized in Table 2, which reveals that the triblock copolymers were present in a microphase-separated form, which is advantageous as regards their mechanical properties and their use as compatibilizers.

The mechanical properties of the block copolymers were determined in tensile tests. To this end, not only films from a toluenic solution (FIG. 1) but also specimens melt-pressed at 180° C. (FIG. 2) were studied. The specimens, each 4 cm in length, were clamped into a tensile tester and stretched at a rate of 20 mm/min. The triblock copolymers having a relatively high ε-caprolactone proportion behaved like typical semicrystalline polymers. Surprisingly, even SBC triblock copolymers having a high styrene content showed very high toughness after melt pressing, as indicated by the maximum extensibility of 600%.

TABLE 1

Molecular characteristics

| SBC No. | % wt. of s | % wt. of b | % wt. of c | $M_n$ a) | $M_w/M_n$ b) |
|---|---|---|---|---|---|
| 1 | 32 | 44 | 24 | 125,000 | 1.23 |
| 2 | 27 | 15 | 58 | 166,700 | 1.30 |
| 3 | 35 | 15 | 50 | 82,800 | 1.23 |
| 4 | 32 | 46 | 22 | 86,300 | 1.20 |
| 5 | 57 | 27 | 16 | 105,000 | 1.22 | a) determined from a 1H-NMR measurement
b) determined by means of gel permeation chromatography (after calibration with a polystyrene standard)

TABLE 2

Calometric data (heating up after crystallization)*

| SBC No. | Tg* of PB [°C.] | Tg of PC [°C.] | Tg of PS [°C.] | $T_m$ [°C.] |
|---|---|---|---|---|
| 1 | −100 | −71 | 102 | 57 |
| 2 | −103 | −76 | 103 | 54 |
| 3 | −104 | −69 | 101 | 52 |
| 4 | −99 | −65 | 101 | 59 |
| 5 | −100 | −71 | 97 | 52 |

*extrapolation to a heating rate of 0 [K/min]

We claim:

1. A process for preparing block copolymers containing at least one block A, constructed from units of styrene, p-chloro-styrene, α-methylstyrene, p-methylstyrene, vinyltoluene or p-t-butylstyrene or mixtures thereof and at least one block C, constructed from units of a cyclic lactone (c), by anionic polymerization, which comprises reacting the living chain end remaining following the construction of block A with diphenylethylene under anionic polymerization conditions before the reaction with the monomer(c).

2. The process of claim 1, wherein monomer (c) is ε-caprolactone.

3. The process of claim 1, wherein the polymerization is carried out in two or more different solvents or solvent mixtures.

4. A proces for preparing block copolymers containing at least one block A, constructed from units of styrene, p-chloro-styrene, α-methylstyrene, p-methylstyrene, vinyltoluene or p-t-butylstyrene or mixtures thereof, at least one block B, constructed from units of a diene (b), attached to block A, and at least one block C, constructed from units of a cyclic lactone (c), by anionic polymerization, which comprises reacting the living chain end remaining following the construction of block B with at least one further monomer unnit (a) selected from the group consisting of styrene, p-chloro-styrene, α-methylstyrene, p-methlystyrene, vinyltoluene or p-t-butylstyrene, and adding to the living chain end so obtained a diarylethene of the formula I

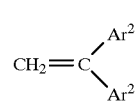

(I)

where $A^1$ and $A^2$ are independently of each other aryl with or without $C_1$–$C_8$-alkyl or $C_1$–$C_8$-alkoxy or halogen single or multiple substitution, under anionic polymerization conditions before the reaction with the monomer (c).

5. A process as defined in claim 4, wherein diarylethylene I is diphenylethylene.

6. The process of claim 5, wherein from 1 to 5 equivalents of said monomer unit (a) are attached.

7. A process as defined in claim 4, wherein monomer (b) is 1,3-butadiene or isoprene.

8. A process as defined in claim 4, wherein monomer (c) is ε-caprolactone.

9. A process as defined in claim 4, wherein the polymerization is carried out in two or more different solvents or solvent mixtures.

* * * * *

UNITED STATES PATENT AND TRADEMARK OFFICE
CERTIFICATE OF CORRECTION

PATENT NO.: 5,932,663

DATED: August 3, 1999

INVENTOR(S): GOTTSCHALK et al.

It is certified that error appears in the above-identified patent and that said Letters Patent is hereby corrected as shown below:

Col. 7, claim 1, line 4, "proces" should be --process--;
        line 13, "unnit" should be --unit--.

Signed and Sealed this

Fourteenth Day of December, 1999

Attest:

Attesting Officer

Q. TODD DICKINSON

Acting Commissioner of Patents and Trademarks